(No Model.) 3 Sheets—Sheet 2.
J. HOFMANN.
WASHING MACHINE.
No. 455,401. Patented July 7, 1891.
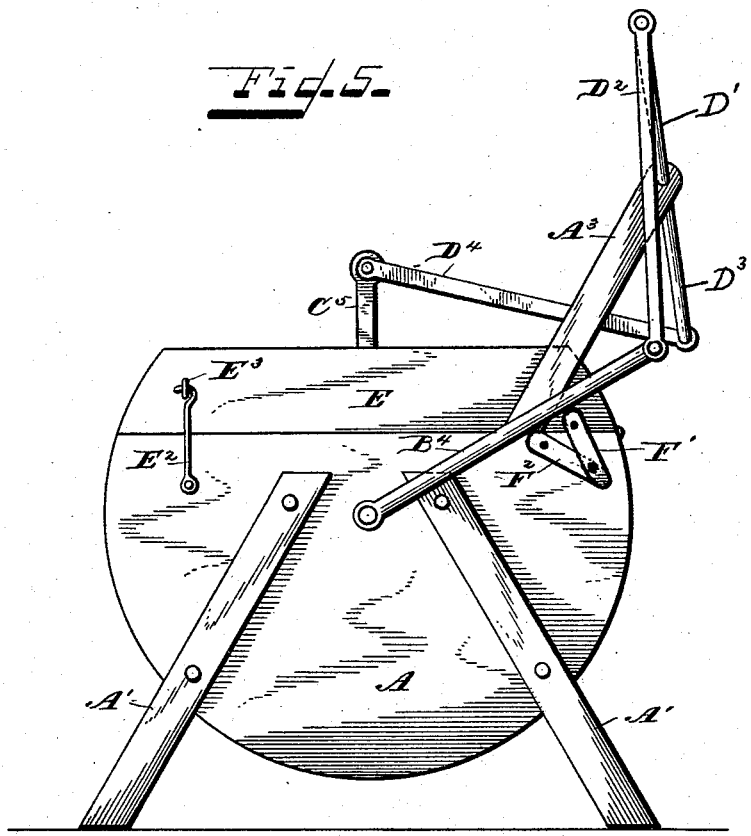

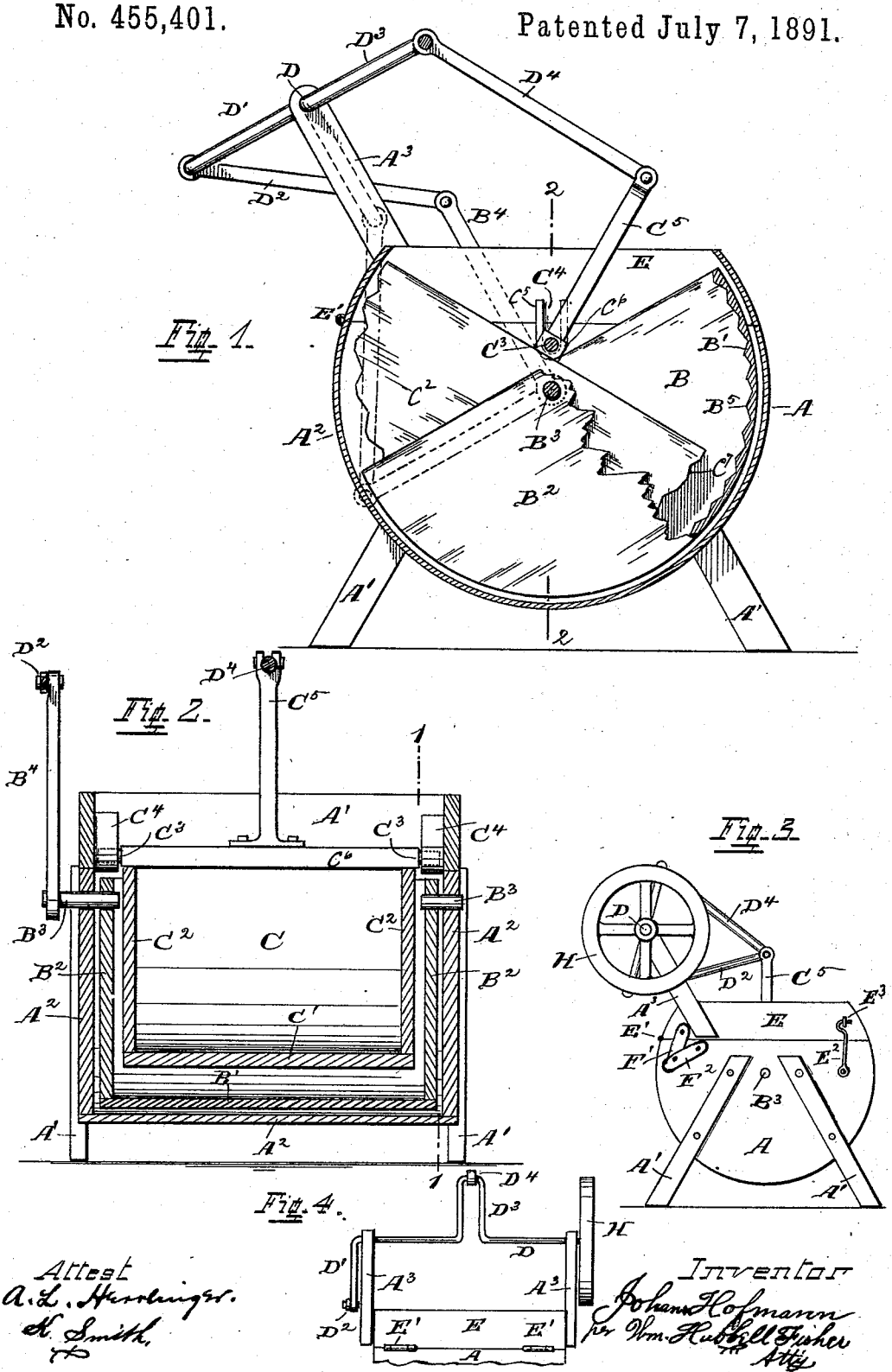

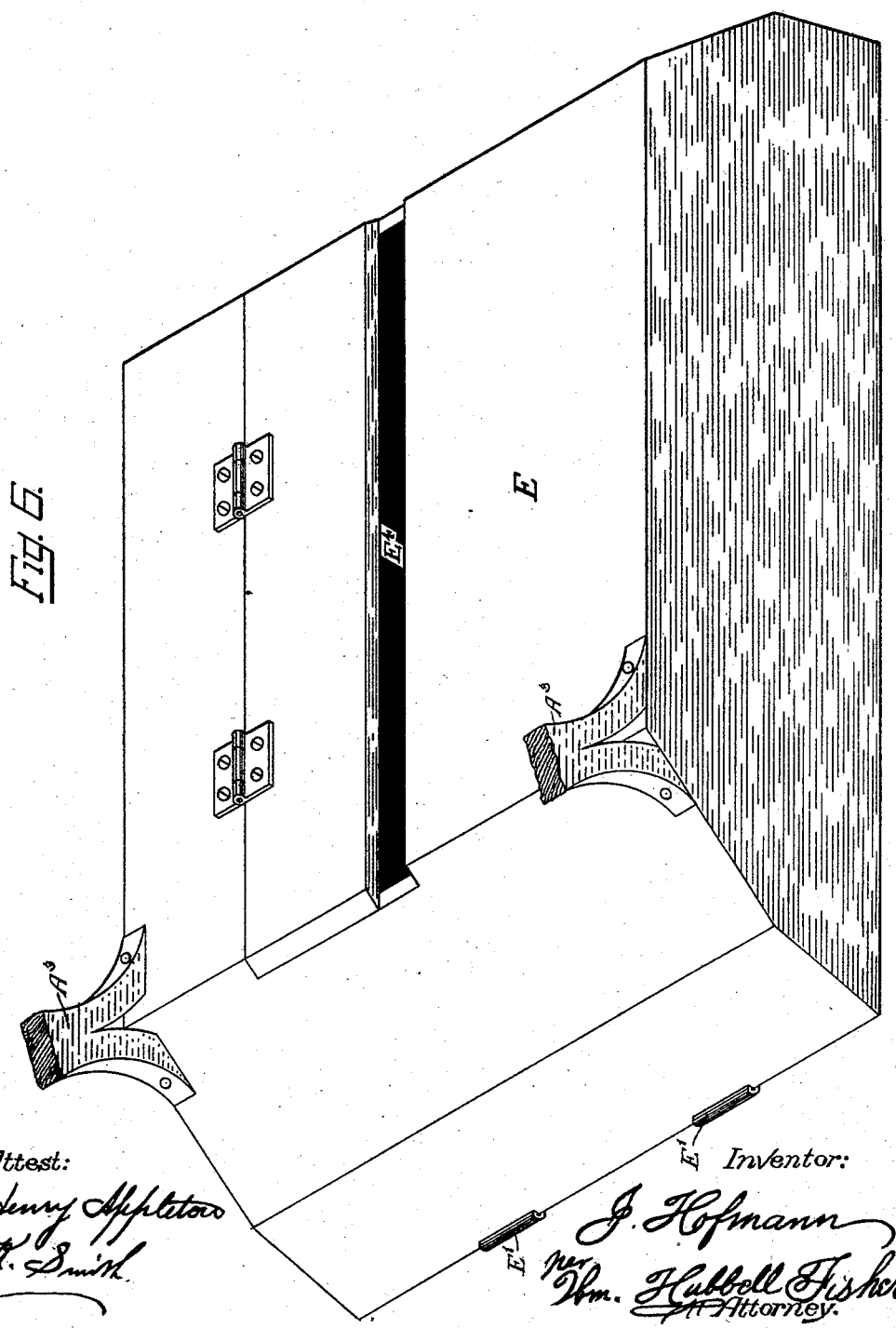

United States Patent Office.

JOHANN HOFMANN, OF CINCINNATI, OHIO, ASSIGNOR, BY DIRECT AND MESNE ASSIGNMENTS, TO CONRAD DIETZ, OF WEST COVINGTON, KENTUCKY, AND JOHN F. DIETZ AND CHARLES IGNATIUS, OF CINCINNATI, OHIO.

WASHING-MACHINE.

SPECIFICATION forming part of Letters Patent No. 455,401, dated July 7, 1891.

Application filed March 17, 1890. Serial No. 344,247. (No model.)

*To all whom it may concern:*

Be it known that I, JOHANN HOFMANN, a subject of the King of Bavaria, residing at the city of Cincinnati, in the county of Hamilton and State of Ohio, have invented certain new and useful Improvements in Washing-Machines, of which the following is a specification.

The several features of my invention and the various advantages resulting therefrom will be apparent from the following description and claim.

In the accompanying drawings, making a part of this specification, and to which reference is hereby made, Figure 1 is an end elevation of a machine embodying my invention. In this view the adjacent end of the outer casing and a part of the adjacent end of the lower rubber and the end of the upper rubber are broken away to better disclose the construction of the mechanism within the casing. Fig. 2 is a vertical central section of the machine, taken in a plane passing through the dotted line 2 2 of Fig. 1 and through the axial centers of the pivots supporting the reciprocating oscillatory rubbers, said pivots being shown in elevation. In this view the upper connecting-rods and cranks, crank-shaft, and the support of the latter are omitted for the sake of economy of space. It may be here remarked that the parts herein omitted are sufficiently shown in Fig. 1. Fig. 3 is an end elevation of the same machine, also illustrating one mode of using a pulley or gear-wheel therewith for enabling the machine to be operated by power other than hand-power. Fig. 4 is an elevation of that side of the machine which is at the left hand of Fig. 3. Fig. 5 is an elevation of the opposite side of the machine from that which is next the spectator in Fig. 1 and illustrates another mode of locating the arm $B^4$ in relation to the pitman $D^4$. Fig. 6 is a view of the preferred form of the top or cover of the machine.

A indicates the outer casing or tub of the machine. The interior of this casing is of a cylindrical form, except that the top of the casing is preferably flat, as shown.

$A'$ represents the peripheral shell of the casing, and $A^2$ $A^2$ the respective ends thereof. The casing is suitably supported. In the present illustrative instance legs $A''$ are shown, constituting a simple and effective means of support. Within the casing is a smaller cylinder B, having peripheral shell $B'$ and ends $B^2$. This cylinder B is similar in shape to the casing A. The space between the interior surface of the casing A and the exterior surface of the cylinder B need be simply enough to allow the latter to oscillate within the casing without touching the latter. The cylinder B is pivoted at each end in a suitable bearing.

$B^3$ $B^3$ respectively indicate the pivots on which the cylinder is hung, one of these being located at one end of the cylinder and the other pivot at the other end of the cylinder. The outer ends of the pivots are, in the present illustrative instance, located in the adjacent ends of the casing and turn in suitable bearings therein. The cylinder B is concentric with the casing A and the axial centers of the pivots $B^3$ coincide with the axial centers of the cylinder and casing.

Within the cylinder B is a second cylinder or tub C, having peripheral shell $C'$ and ends $C^2$ $C^2$. This cylinder C is provided with arms $C^3$, one at each end $C^2$ of the cylinder.

At or in the inner side of each end of the casing A, in that section of said casing which is uppermost and indicated by the letter E, is a groove or journal-bearing $C^4$, preferably formed by ribs, as $C^5$ $C^5$. In one of these bearings one of the arms $C^3$ is located and in the other of these bearings the other of these arms is located. At the lower end the bearing is filled and constitutes a horizontal as well as vertical bearing for the arm $C^4$, playing therein when the cylinder C has been allowed to descend as low as it is desired to go. When the cylinder C is thus resting upon these bearings, the outer peripheral surface of this cylinder is close to the inner peripheral surface of cylinder B. The outer end of the pivot-arm $B^3$ of cylinder B projects beyond the casing A, and is there rigidly connected to a lever-arm $B^4$.

To the top of the cylinder C is rigidly attached the arm C⁵. The mode of its attachment may be varied. A preferred mode consists as follows: A cross-piece C⁶ is present. One end of this cross-piece is connected to one end of the cylinder C and the other end of this brace is connected to the upper portion of the other end of the said cylinder. The lower end of this arm C⁵ is connected to this brace C⁶, preferably near to or at its middle, substantially as shown. From each side of the casing or cover extends upward an arm A³, and a shaft D extends through said arms and turns in journal-bearings in said arms. In Fig. 1 the arm A³ is shown connected to the end of the casing or cover, while in Fig. 6 the lower end of each arm A³ is shown connected to the top part of the cover. In this last-named figure the arms A³ are broken away for economy of space and for the sake of better illustrating the preferred description of cover. In this shaft D, between said arms A³, is the double crank D³, rigidly connected to said arms. The free end of this crank is pivoted to one end of the pitman D⁴, the other end of the said pitman being connected to the arm C⁵. The shaft D also carries a crank D', preferably fixed to the shaft outside of that arm D which is adjacent to arm B⁴. The free end of crank D' is pivotally connected to the free end of the arm B⁴ by the pitman D².

The rotation of the shaft D is accomplished by any suitable means—as, for example, by the well-known hand-crank or by other power. In the drawings—viz, in Fig. 3—a band-wheel H is shown for the attachment of a belt.

The inner surface of the peripheral shell of cylinder B is provided with teeth or ridges, sometimes termed "rubbers" or "knuckles," B⁵. These rubbers are preferably elongated and run parallel to the longitudinal axis of the cylinder. Likewise the exterior of the periphery of the cylinder C is provided with similar teeth or ridges C⁷, running parallel to the longitudinal axis of the cylinder.

The machine is provided with a suitable cover E, hinged at or near the rear edge, as at E'. A suitable device for preventing the cover to open back too far consists of links F' and F². The link F' is pivoted at one end to the cover and at the other end to the free end of link F², the other end of the last-named link being pivoted to the casing A. A suitable latch, as E² E³, is provided to hold the cover down to the lower portion of the casing, E² indicating a hook pivoted to the stationary portion of the casing and E³ indicating an eye in the cover E for the reception of the point of said hook. The cover is really a part of the cylindrical casing A and carries the bearings C⁴, heretofore mentioned, and it is to this part of the casing that the arms A³ are attached. When the cover E is lifted, the cylinder C is elevated and raised out of the cylinder B, which latter remains in the casing. The reason why the cylinder C is elevated is because its arms C³ are located in the respective bearings C⁴, and as the cover is raised these arms rest on the bottom of the said bearings and are lifted therewith. A slot E⁴, in the form of cover shown in Fig. 6, enables the arm B⁴ to oscillate back and forth the distance it is moved by the pitman D².

The mode in which my improvements operate is as follows, viz: The cover and cylinder B are lifted up and thrown back. The casing and cylinder B are filled with water or soapsuds, preferably heated to the desired temperature. The clothes to be washed are then thrown into cylinder B. The cover is lowered, bringing the cylinder C down into the casing and into cylinder B. The rubbers or ridges C⁷ of cylinder C rest upon the clothes, and the clothes in turn rest upon the rubbers or ridges B⁵ of cylinder B. The clothes are thus compressed between the opposing ridges of cylinders B and C. A rotary movement is now imparted to the shaft D, and thereby the arms C⁵ and B⁴ are reciprocated in opposite directions. The reciprocal movements of these arms cause the cylinders B and C to reciprocate curvilinearly in opposite directions, and the clothes between these cylinders are consequently subjected to a rubbing operation by the ridges on the opposing cylinders. At the same time the soapy water rushes through the clothes and does its part in the operation of washing the clothes. The moving of both of the surfaces which are in contact with the clothes, and the reciprocation of one of the surfaces in one direction while the other of the surfaces is reciprocated in the other direction, the surfaces being furnished with rubbers or other suitable projections, causes the clothes to be rapidly and thoroughly washed and cleaned.

When preferred, the arm B⁴ may be located at substantially right angles to a vertical plane passing through the axial center of the casing A, and the longitudinal axis of the pitman D² will then assume a position more nearly vertical. Such a position of the arm B⁴ and pitman D² will allow of the cover E being thrown up and back without removing the pivot-pin which connects arm B⁴ to pitman D², which must otherwise be done to prevent cylinder B being tipped while the cover is thrown back.

While the various features of my invention are preferably employed together, one or more of said features may be used without the remainder, and in so far as applicable one or more of said features may be employed with washing-machines other than the one herein specifically set forth.

What I claim as new and of my invention, and desire to secure by Letters Patent, is—

In a washing-machine, the stationary cylindrical casing A and cylinder B, located within said casing and having rubbers on its inner side and pivoted at B³, cylinder C, located within cylinder B and having rubbers on its outer side and having arms $C^3$, the cover E of the casing A, having bearings $C^4$, each of which latter respectively receives an adjacent arm $C^3$, arm $C^5$, rigidly connected to cylinder C, arm $B^4$, rigidly connected to the cylinder B, cover E, having supports carrying shaft D, having cranks $D'$ and $D^3$, pitman $D^4$ being pivotally connected to crank $D^3$ and arm $C^5$, and pitman $D^2$, pivotally connected to the crank $D'$ and arm $C^4$, substantially as and for the purposes specified.

JOHANN HOFMANN.

Attest:
 A. L. HERRLINGER,
 K. SMITH.